Jan. 14, 1936.  E. B. G. LEFEVRE  2,027,833
AUTOMOBILE DOOR HINGE
Filed Aug. 28, 1933  3 Sheets-Sheet 1
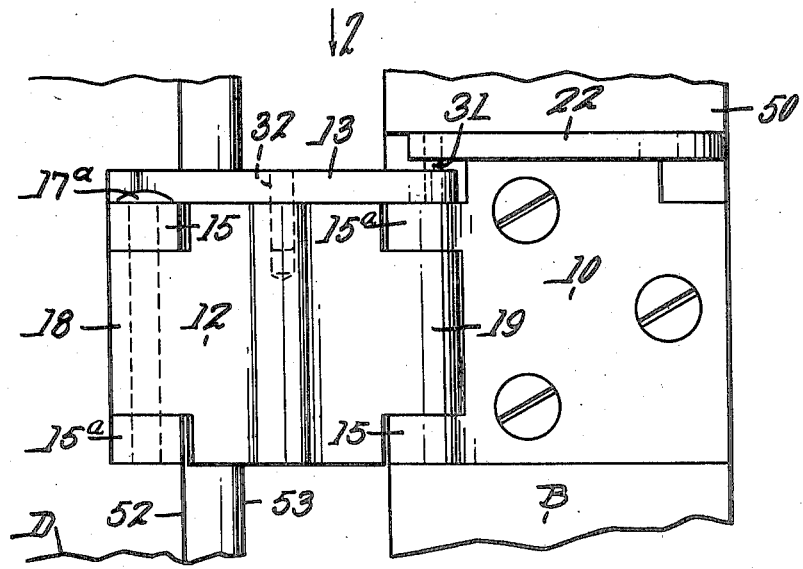
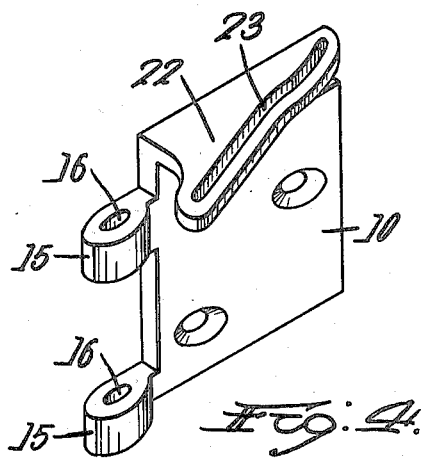
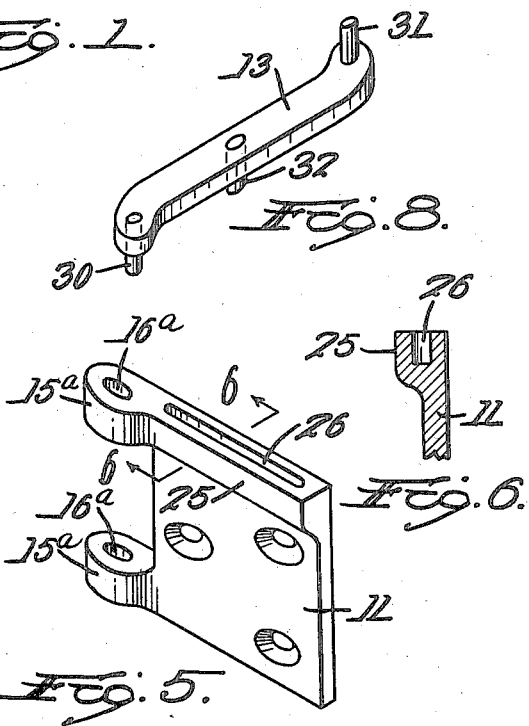
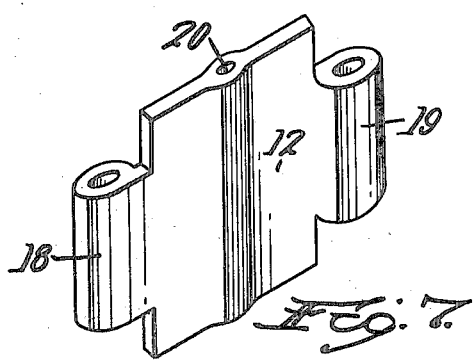

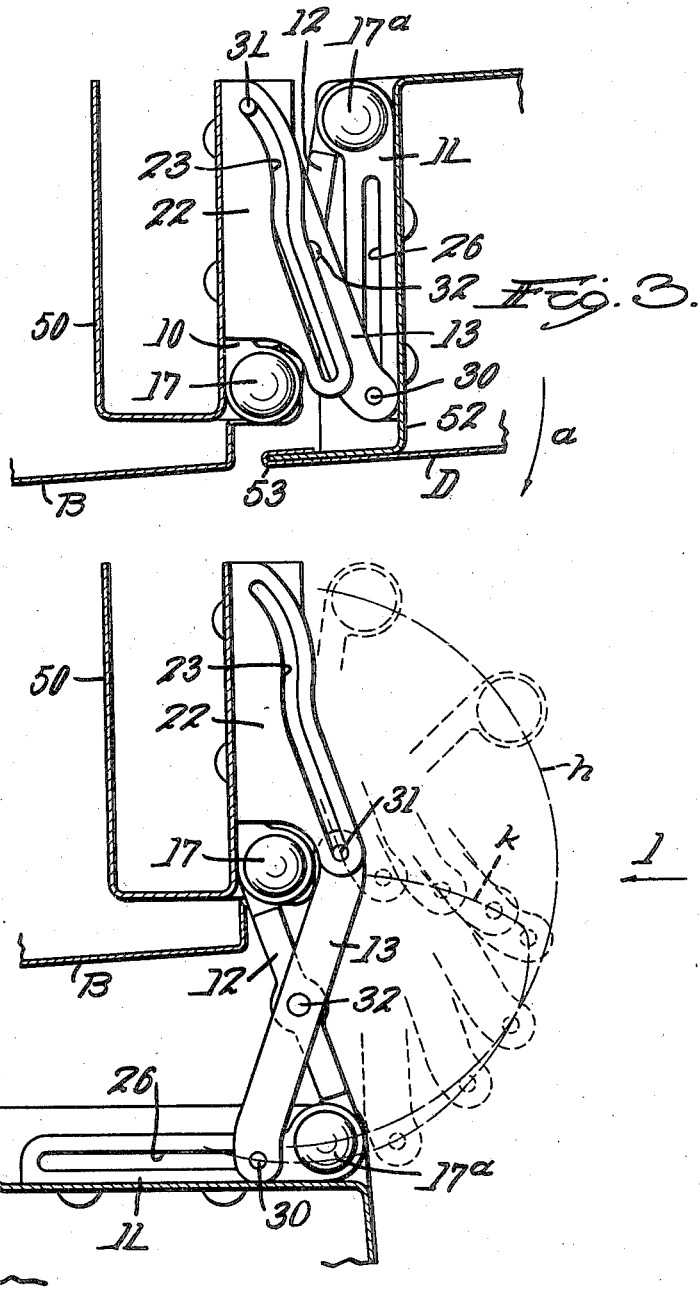

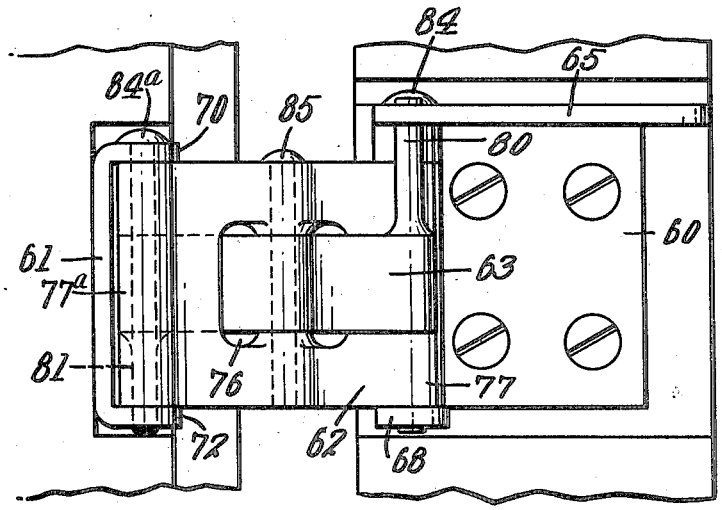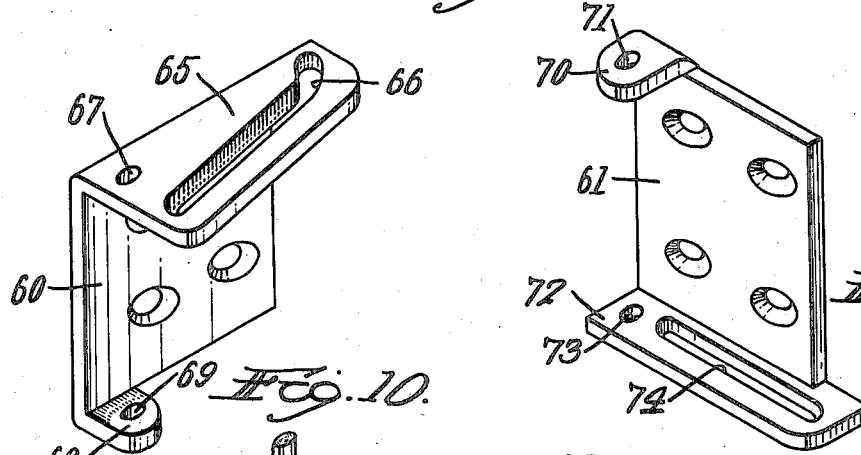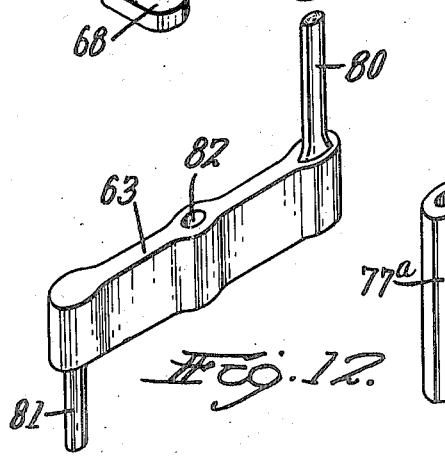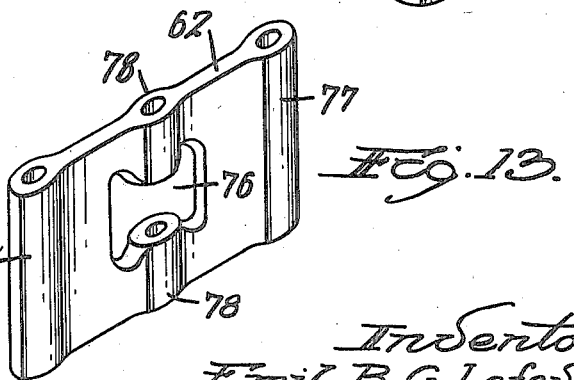

Patented Jan. 14, 1936

2,027,833

UNITED STATES PATENT OFFICE 2,027,833

AUTOMOBILE DOOR HINGE

Emil B. G. Lefevre, Detroit, Mich.

Application August 28, 1933, Serial No. 687,079

6 Claims. (Cl. 16—164)

This invention relates to hinges for automobile doors or windows or other similar structures in which the door or movable member must be swung to an outwardly offset position in order to provide clearance for some adjacent structure, such as an outwardly convex body surface or projecting trim.

It is the general object of my invention to provide a construction in which a single hinge link has extended bearing connections with a pair of hinge plates and in which special provision is made for directing and controlling the outward swinging movement of the movable hinge plate and the parts supported thereby.

My invention further relates to arrangements and combinations of parts which will be hereinafter described and more particularly pointed out in the appended claims.

Preferred forms of the invention are shown in the drawings, in which

Fig. 1 is a front elevation of one form of my improved hinge in open position and looking in the direction of the arrow 1 in Fig. 2;

Fig. 2 is a plan view of the hinge in open position, looking in the direction of the arrow 2 in Fig. 1;

Fig. 3 is a view similar to Fig. 2 but showing the parts in closed position;

Fig. 4 and 5 are perspective views of the hinge plates;

Fig. 6 is a detail sectional view, taken along the line 6—6 in Fig. 5;

Fig. 7 is a perspective view of the hinge link;

Fig. 8 is a perspective view of the controlling link;

Fig. 9 is a view similar to Fig. 1 but showing a modified construction, and

Figs. 10, 11, 12 and 13 are perspective views of the different parts forming the hinge shown in Fig. 9.

Referring to Figs. 1 to 8, my improved hinge comprises hinge plates 10 and 11, a hinge link 12 and a controlling link 13. The hinge plates 10 and 11 are provided with spaced lugs 15 and 15a having openings 16 and 16a to receive hinge pins 17 and 17a by which end portions 18 and 19 (Fig. 7) of the hinge link 12 are pivotally connected to the hinge plates 10 and 11.

The end portions 18 and 19 are preferably oppositely offset with respect to the body of the hinge link 12. The hinge link 12 is also enlarged in its middle portion and is provided with a transverse opening 20 for a purpose to be described.

The hinge plate 10 is provided with an offset flange 22 (Fig. 4) having a cam slot 23 formed therein and extending lengthwise of the hinge plate but in an irregular angular relation thereto.

The hinge plate 11 is provided with a thickened portion 25 (Figs. 5 and 6) having a groove 26 formed therein, said groove extending lengthwise of the hinge plate and being preferably parallel to the back surface thereof.

The controlling link 13 (Fig. 8) is provided with oppositely offset ends to receive a downwardly projecting guide pin 30 and an upwardly projecting guide pin 31. The link 13 also has a downwardly projecting pin 32 substantially at the middle of its length.

The parts are assembled by placing the pin 32 in the hinge link opening 20, the pin 30 in the groove 26, and the pin 31 in the cam slot 23. The hinge pins 17 are then inserted, thereby holding all parts in assembled relation.

In Figs. 2 and 3 I have shown my improved hinge in use, with the hinge plate 10 secured to the pillar or post 50 of an automobile body B and with the hinge plate 11 secured to an edge portion 52 of an automobile door D. The associated edge portions of the body B and door D are preferably recessed sufficiently to receive the plates 10 and 11, and the door D may have a projection 53 concealing the hinge structure and serving as a wind-break.

As the door D is swung outward in the general direction of the arrow $a$ in Fig. 3, the controlling link 13 comes into operation to direct the movement of the hinge plate 11 and the door D associated therewith.

The controlling action of the link 13 is effected jointly by the movement of the pin 31 in the cam slot 23, the movement of the pin 30 in the groove 26, and the pivotal movement of the controlling link 13 on the hinge link 12.

The effect of the controlling link 13 is such that the movement of the door D after initial opening is largely a movement of separation laterally from the hinge plate 10 and pillar 50, with a comparatively small forward or turning component. The initial opening effect is caused by the outwardly curved end portion of the slot. After this lateral movement is largely completed, a relatively rapid turning movement of the door brings the parts to the open position shown in Fig. 2. The path of movement of the hinge pin 17a is indicated by the broken line $h$ in Fig. 2, and the path of movement of the pin 31 is shown by the broken line $k$.

With this method of operation, the wind-break or edge portion 53 clears the body B in all positions thereof. The controlling link 13 acts as a door check when in the position shown in Fig. 2, the pins 30 and 31 abutting the ends of the slot 23 and groove 26.

In Figs. 9 to 13 I have shown a modified construction of my improved hinge, comprising hinge plates 60 and 61, a hinge link 62 and a controlling link 63. The hinge plates 60 and 61 are preferably formed from sheet metal having portions offset at the upper and lower ends as shown in the drawings.

The hinge plate 60 has an upper flange 65 provided with a cam slot 66 and a hinge pin opening 67. An ear 68 at the bottom of the plate 60 has a corresponding hinge pin opening 69.

The hinge plate 61 has an offset lug 70 at the top provided with a hinge pin opening 71, and has an offset flange 72 provided with a hinge pin opening 73 and with a straight slot 74.

The hinge link 62 is provided with a central opening 76, with enlarged end bearing portions 77 and 77ª and with thickened intermediate bearing portions 78. The controlling link 63 is provided with an upwardly extending stud 80 at one end and with a depending stud 81 at the other end. The link 63 also has a thickened middle portion provided with a bearing opening 82.

The parts constructed as above described are assembled as shown in Fig. 9 and are held in assembled relation by hinge pins 84 and 84ª and a pin 85 connecting the links 62 and 63 at their middle bearing portions.

The operation of the device is the same as in the form previously described, but this form possesses certain advantages in manufacture and can be produced more economically than the form shown in Figs. 1 to 8.

Having thus described two forms of my invention and the advantages thereof, I do not wish to be limited to the details herein disclosed, otherwise than as set forth in the claims, but what I claim is:—

1. A hinge comprising a pair of hinge plates, a hinge link, and a controlling link, said hinge link being pivoted at its ends to said hinge plates and being pivoted at an intermediate point to said controlling link, one of said hinge plates having a cam portion and the other hinge plate having an elongated guiding slot and said controlling link having end parts slidably engaging said cam portion and elongated guiding slot as the hinge is opened or closed and thereby controlling the opening and closing movements of said hinge.

2. A hinge comprising a pair of hinge plates, a hinge link, and a controlling link, said hinge link being pivoted at its ends to said hinge plates and being pivoted at an intermediate point to said controlling link, one of said hinge plates having a flange with an elongated cam slot therein, the second hinge plate having an elongated opening therein, and said controlling link having end parts slidable in said slot and opening as the hinge is opened or closed.

3. The combination in a hinge as set forth in claim 2, in which the cam slot is inclined relatively to its hinge plate and in which the end portion of the cam slot adjacent the hinge pivot is more widely spaced from said hinge plate.

4. The combination in a hinge as set forth in claim 2, in which the cam slot is inclined relatively to its hinge plate and in which the end portion of the cam slot adjacent the hinge pivot is more widely spaced from said hinge plate, and in which the other end portion of said cam slot is outwardly convex.

5. The combination in a hinge as set forth in claim 2, in which the elongated opening is formed in a flange projecting substantially perpendicularly to said second hinge plate and extends substantially parallel to its supporting hinge plate.

6. The combination in a hinge as set forth in claim 2, in which the cam slot is formed in a flange at one edge portion of one hinge plate and the elongated opening is formed in a flange at the correspondingly positioned edge portion of the other hinge plate, said two flanged edge portions being closely adjacent and at the same edge of the hinge when the hinge is closed.

EMIL B. G. LEFEVRE.